(No Model.)
A. G. SNELL.
CANOPY HOLDER FOR CHILDREN'S CARRIAGES.
No. 312,395. Patented Feb. 17, 1885.
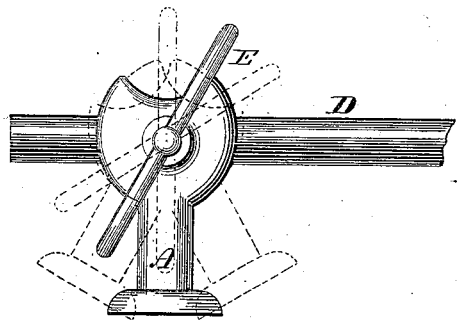
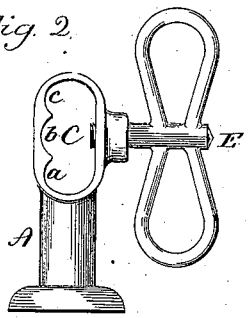 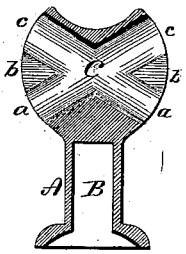 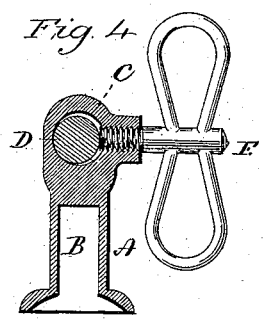
Witnesses
Adolphus G. Snell,
Inventor
By atty.

UNITED STATES PATENT OFFICE.

ADOLPHUS G. SNELL, OF NEW HAVEN, CONNECTICUT.

CANOPY-HOLDER FOR CHILDREN'S CARRIAGES.

SPECIFICATION forming part of Letters Patent No. 312,395, dated February 17, 1885.

Application filed December 15, 1884. (No model.)

*To all whom it may concern:*

Be it known that I, ADOLPHUS G. SNELL, of New Haven, in the county of New Haven, and State of Connecticut, have invented a new Improvement in Canopy-Holders for Children's Carriages; and I do hereby declare the following, when taken in connection with accompanying drawings and the letters of reference marked thereon, to be a full, clear, and exact description of the same, and which said drawings constitute part of this specification, and represent, in—

Figure 1, a side view of the holder as applied to the rod; Fig. 2, an edge view of the holder; Fig. 3, a vertical central section looking toward the side in which the radial seats are formed; Fig. 4, a vertical transverse section as applied to the rod.

This invention relates to an improvement in the socket or holder for the canopy of children's carriages. These sockets are usually arranged upon a bar extending up from the body of the carriage and forward, the socket carrying the canopy, and adjustable on the rod, so that it may be turned to different angles to shade the child in the carriage. Various clamping devices have been arranged for such adjustment of the canopy-socket, but more or less complicated, and accordingly expensive.

The object of my invention is to construct a socket which may be cast substantially complete, ready for use, and without dividing the socket to cause it to clamp the rod; and it consists in a socket adapted to receive the stem of the canopy, having an opening through it above in a plane parallel with the axis of the canopy-stem, the said opening constructed with several seats at an angle to each other, the said seats being on one side of the opening and so as to rest against the rod, the said seats substantially crossing each other at the center, combined with a set-screw through the opposite side at the center to bear upon the rod and force it into either of the said seats, and as more fully hereinafter described.

A represents the socket, which is of usual form, fitted with a cavity, B, to receive the stem of the canopy. Above the cavity an opening, C, is made parallel with the plane of the axis of the stem of the canopy. At the center this opening is in diameter corresponding to the rod D, to which the holder is to be applied. From the center each way the opening increases in vertical width, as seen in Fig. 3. On one side of this opening several seats for the rod are made, here represented as three, *a b c*. The central seat runs at right angles to the axis of the socket A, and is concave in transverse section, as seen in Fig. 2. The second seat, *a*, runs diagonally across the horizontal seat *b*, but is of like concavity. The third seat also runs diagonally across, but opposite to the seat *a*, as seen in Fig. 3, and is of like concavity, as seen in Fig. 2. Through the opposite side at the center a set-screw, E, is introduced. The socket is set upon the rod, the rod passing through the opening C, and if it rest in the seat *b*, and the screw there set, it will stand at right angles to the axis of the canopy-socket, as seen in Fig. 1, and thereby hold the canopy in a horizontal plane; but if the socket be turned, say, to the left, to bring the seat *a* into line with the rod, and so that the rod take a bearing therein, and the screw set thereon, then the canopy will stand obliquely; or, if the socket be turned in the opposite direction, so that the bearing of the rod will be taken in the seat *c*, and there clamped, then it will stand oblique in the opposite direction, and as seen in Fig. 1. These oblique or diagonal seats may be increased in number; but I find two oblique seats and one horizontal seat to answer all practical purposes. All the seats radiate substantially from the center, be they more or less in number.

I claim—

The herein-described canopy-holder for a child's carriage, consisting of the socket A, adapted to receive the stem of the canopy, and constructed with an opening, C, above, one side of said opening constructed with several seats radiating from the center, combined with a clamping-screw through the center of the opposite side, substantially as described.

ADOLPHUS G. SNELL.

Witnesses:
  JOS. C. EARLE,
  J. H. SHUMWAY.